United States Patent [19]

Parulski et al.

[11] Patent Number: 5,025,313

[45] Date of Patent: Jun. 18, 1991

[54] SYSTEM FOR MINIMIZING OPTICAL DISTORTIONS AND CHROMATIC ABERRATIONS IN A LINEAR COLOR SCANNER

[75] Inventors: Kenneth A. Parulski; David Kessler, both of Rochester, N.Y.

[73] Assignee: Eastman Kodak Company, Rochester, N.Y.

[21] Appl. No.: 422,331

[22] Filed: Oct. 16, 1989

[51] Int. Cl.⁵ .................... H04N 9/11; H04N 5/253
[52] U.S. Cl. ..................................... 358/54; 358/214; 355/38
[58] Field of Search ............... 358/54, 212, 214, 215, 358/216, 75, 76, 494; 355/27, 38, 77

[56] References Cited

U.S. PATENT DOCUMENTS

| | | | |
|---|---|---|---|
| 4,255,764 | 3/1981 | Howe | 358/214 |
| 4,278,995 | 7/1981 | Fearnside et al. | 358/54 |
| 4,467,361 | 8/1984 | Ohno et al. | 358/212 |
| 4,951,084 | 8/1990 | von Stein et al. | 355/38 |

FOREIGN PATENT DOCUMENTS 2184320  6/1987  United Kingdom .

Primary Examiner—James J. Groody
Assistant Examiner—Kim Yen Vu
Attorney, Agent, or Firm—Edward Dugas

[57] ABSTRACT

In a preferred system a light source provides a light beam which illuminates a film image. A lens is placed in the path of the light beam to focus the image from the film on to a tri-linear color sensor. The length of each of the image sensors and spacing between sensor elements is selected in order to correct for distortions lateral chromatic aberrations in the line scan direction. Longitudinal chromatic aberrations are corrected by tilting the tri-linear sensor in the image plane to align the center of focus for the red, green and blue sensors with the center of focus for the red, green and blue components of the beam, respectively.

7 Claims, 2 Drawing Sheets

SYSTEM FOR MINIMIZING OPTICAL DISTORTIONS AND CHROMATIC ABERRATIONS IN A LINEAR COLOR SCANNER

FIELD OF INVENTION

The present invention is related to color scanners for converting film images or documents to electronic form.

BACKGROUND OF THE INVENTION

There are a number of product applications for high volume, low cost color scanners using three linear sensors, one each for red, green, and blue, on a single chip. One such system is disclosed in U.S. Pat. No. 4,278,995, entitled "Color Line Sensor for Use in Film Scanning Apparatus" by W. T. Fearnside et al, which patent is assigned to Eastman Kodak Company, the assignee of the present application. These types of scanners require expensive "apochromatic" lenses which are designed to yield red, blue, and green images which are exactly the same size and which are focused at the same plane so that the identically sized CCD linear sensors, one for each color red, green, and blue, capture a properly registered image when positioned at the focal plane of such a lens.

One way to reduce the cost of this type of scanner is to use an "achromatic" lens and some means for correcting the distortions normally encountered with the use of such a lens. For more details about "apochromatic" and "achromatic" lenses see: Ray, Sidney F., entitled "Applied Photographic Optics: Imaging Systems for Photography, Film and Video", Focal Press, Boston, Mass. 1988, ISBN 0-240-51226-X.

Another patent of interest for its teachings of an approach for correcting distortions caused by lenses is U.S. Pat. No. 4,467,361, entitled "Image Pick-Up Apparatus" by K. Ohno et al, wherein an image sensor is curved into a spherical shape to correspond to the curvature of field of an objective lens. This curvature may take any desired shape to correct for various aberrations of the objective lens.

SUMMARY OF THE INVENTION

The present invention has as an object to provide an improved system for minimizing optical chromatic aberrations in a linear color scanner.

It is another object of the present invention to correct for lateral chromatic aberrations by using a tri-linear sensor having red, green, and blue CCDs of different lengths, to compensate for differences in magnification for red, green, and blue image components.

It is another object of the present invention to reduce longitudinal chromatic aberrations in a tri-linear CCD scanner due to an image generating system which focuses the red, green, and blue image components at different focal planes.

In one embodiment of the invention, a tri-linear color sensor having three lines of sensor elements one each for red, green, and blue, formed on a planar substrate is provided with suitable spacing between the three lines and is tilted with respect to the image planes to an angle which provides the best focus for each of the three lines of sensor elements.

In another embodiment of the invention, a transparent material of the appropriate thickness and index of refraction is positioned over one or more of the CCD sensor lines to adjust the focal planes of the red, green and blue images to the same plane.

The above and other objects of the present invention will become more apparent when taken in conjunction with the following description and drawings wherein like characters indicate like parts and which drawings form a part of the present invention.

DESCRIPTION OF THE PREFERRED EMBODIMENTS

Figure 1:
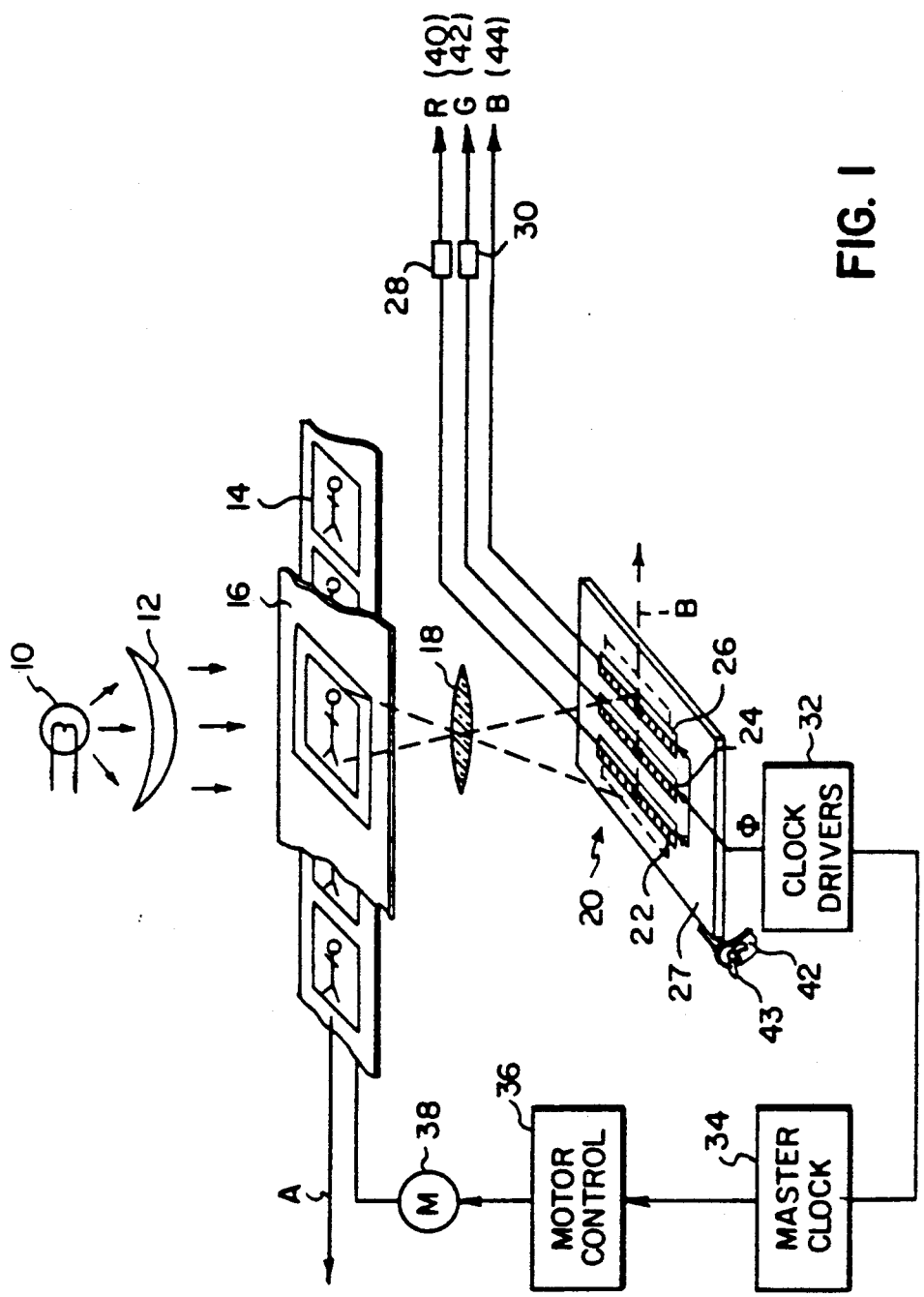
FIG. 1 is a schematic diagram of a film scanning apparatus incorporting the present invention.

For purposes of illustration, a simplified film scanning apparatus employing a color line sensor according to the present invention is shown schematically in FIG. 1. It is to be understood that the scanning apparatus employed with the present invention may include a rotating polygon frame-rate converting scanner of the type disclosed in copending U.S. Pat. application Ser. No. 068,032 now Pat. No. 4,255,764 entitled "Film Scanning Method and Apparatus Employing Optical Splice Technique for Frame-Rate Conversion" by D. G. Howe.

The scanning apparatus as shown in FIG. 1 includes a light source 10 and condensing lens 12 for illuminating a portion of film 14 in a film gate 16. Light passing through the film 14 is imaged by a lens 18 onto a line sensor 20 to form a two dimensional color image.

As the film 14 is moved in the direction of arrow A, the projected image of the film moves in the direction of arrow B relative to line sensor 20. The line sensor scans the image of the film line by line in a direction generally perpendicular to the length of the film and the motion of the film displaces the successive scan lines in a direction parallel with the length of the film, to scan the image of a film frame in a line by line fashion. Sensor 20 is operated at a line rate sufficient to scan an image of a film frame with an appropriately high resolution, for example 3072 lines per film frame.

The line sensor 20 is a tri-linear device which includes three line sensing arrays 22, 24 and 26, such as charge coupled device (CCD) line sensors, fabricated on a silicon substrate 27. Each line sensor contains a plurality of sensing elements, for example, 2048 elements per line. The line sensing arrays are spaced apart by distances (see FIG. 2) $d_1$ and $d_2$, which are integer multiples of the distance "ds" between scan lines in the focal plane. Therefore, $d_1 = n_1 ds$ and $d_2 = n_2 ds$ where $n_1$ and $n_2$ are integers.

As is well known, each line sensing array is covered with a color filter strip to tailor the spectral response of the array to a particular color. Array 22 is covered with a red filter strip; array 24 with a green filter strip; and array 26 with a blue filter strip. Thus, array 22 produces a signal representing the red component of the scanned image, array 24 produces a signal representing the green component of the scanned image, and array 26 produces a signal representing the blue component of the scanned image. The red, green, and blue signals emerging from line sensor 20 at any given time, therefore, represents the same column in the scanned image. However, the green signal is delayed relative to the red signal by an amount equal to the time required to scan $n_1$ lines, the blue signal is delayed relative to the red signal by an amount required to scan $n_2$ lines. To compensate for these delays, a delay circuit 28 provides an $n_2$ line delay for the red signal, and a delay circuit 30 provides an $(n_2-n_1)$ line delay for the green signal. The red output 40 from line delay 28, the green output 42 from line delay 30, and the blue output 44 from sensor 20 thus forming a spatially co-incident color signal which can be processed, recorded, or electronically printed. The scanning actions of the line sensing arrays are controlled by multiphase clock signals Φ supplied by clock drivers 32. The clock drivers are in turn driven by a master clock 34 which also drives a motor control circuit 36. The motor control circuit 36, in turn, controls a film transport motor 38 which advances the film 14 along the film gate 16 in order to scan the film frame.

Figure 2:
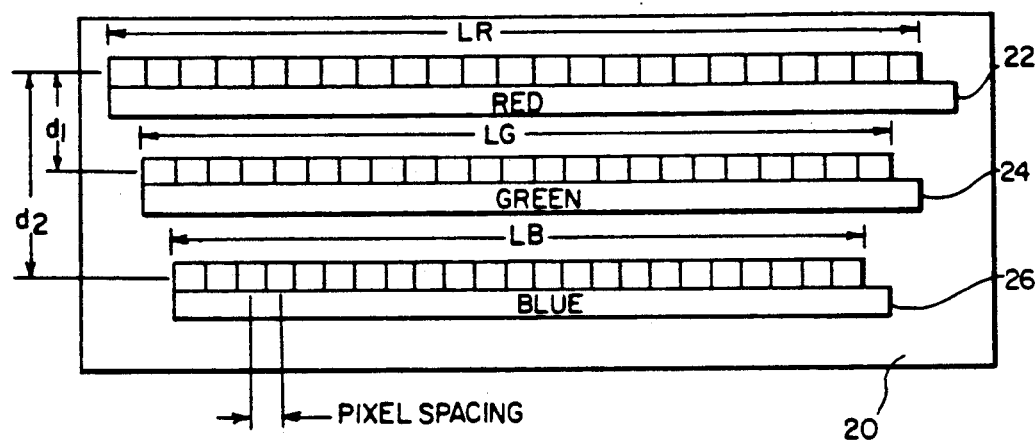
FIG. 2 is a schematic diagram of an embodiment of a tri-linear sensor which may be used in the apparatus of FIG. 1.

The plane of the image sensor 20 is tilted at an angle Θ relative to the red focal plane and locked into place with a mounting means such as a support bracket 42 and a wing nut 43 affixed to a screw 44 that is attached to the flat support 27, such that the light components associated with a particular array are focused on their respective arrays. That is, the red component is focused on the array 22, the green component is focused on the array 24, and the blue component is focused on the array 26. This is accomplished by selecting the integers $n_1$ and $n_2$, and the tilt angle Θ such that sin Θ$n_1$ds equals the distance between the red focal plane and the green focal plane, and sin Θ$n_2$ds equals the distance between the red and green focal plans. This corrects for longitudinal chromatic aberrations. Referring to FIG. 2, which depicts line sensor 20, each line sensing array is formed with a length that compensates for the distortions and lateral chromatic aberrations created by the lens 18. For typical lenses, the red sensing array 24 is the longest and the green sensing array 26 is the shortest. The differences in image sizes among red, green, and blue in the line scan direction (along the length of the array) are corrected by changing the length of the associated sensors to appropriately compensate for the lens distortion. Any nonlinearities in the image size, in the line scan direction, are compensated for by appropriately varying the distances between pixels from the center to the edges of the sensor. Differences in size between the red, green, and blue images in the page scan direction (perpendicular to the RGB sensors) do not occur because only the central area of the lens is used to capture the image.

Figure 3:
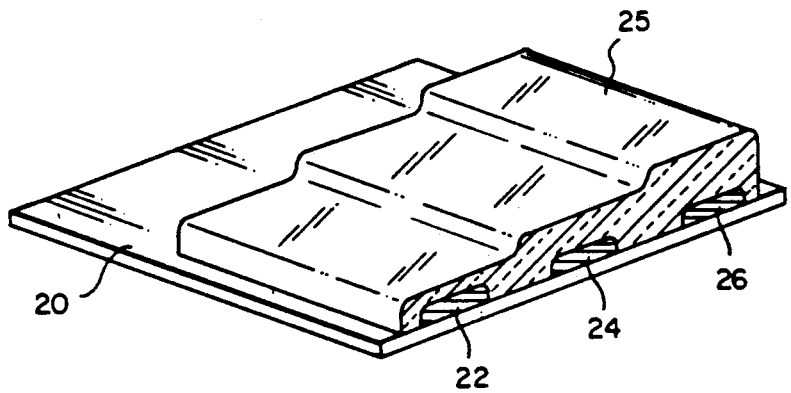
FIG. 3 is an end view of another embodiment of a tri-linear sensor which may be used in the apparatus of FIG. 1.

Instead of tilting the line sensor 20 to correct longitudinal chromatic aberrations, the line sensor 20 can be overlayed with a layer of material 25 as shown in FIG. 3. The material has an index of refraction and a thickness that is selected to properly compensate for differences in the focal plane locations of the red, green, and blue components and cause the red, green, and blue images to properly focus on the red, green, and blue image sensor arrays. The material may be positioned over one or more of the arrays to achieve the desired results.

In summary, the tri-linear sensor is designed and mounted so that it corrects for optical distortions introduced by a lens. The pixel spacings and sensor line lengths are chosen to correct lateral distortions and chromatic aberrations. Longitudinal chromatic aberrations are corrected by choosing the proper line spacing and tilting the sensor, or by overlaying the red, green, and blue CCDs with a transparent material of the appropriate thickness for each color.

While there has been shown what are considered to be the preferred embodiments of the invention, it will be manifest that many changes and modifications may be made therein without departing from the essential spirit of the invention. It is intended, therefore, in the annexed claims, to cover all such changes and modifications as may fall within the true scope of the invention.

We claim:

1. In a color image scanning apparatus of the type having means including image forming optics for projecting a two-dimensional color image, a color image sensor means having a plurality of linear array sensors mounted in a flat plane with each linear array being responsive to a particular color for providing an output indicative of the intensity of the light impinging thereon, means for scanning the projected image at a predetermined line scan rate, and means for continuously displacing the projected image in a direction perpendicular to the line scan to effect an image raster scan composed of a number of spaced lines, the improvement comprising:

a transparent layer of material having an index of refraction for correcting the focus of the projected image from said forming optics positioned over at least one of said linear arrays.

2. A color image scanning apparatus according to claim 1 wherein each linear array has a length that is a function of the distortion or the chromatic aberration of said image forming optics.

3. A color image scanning apparatus according to claim 1 wherein each linear array is formed of a plurality of sensing elements each spaced from the others by a spacing that minimizes the distortion or the lateral chromatic abberation of said image forming optics.

4. In a color image scanning apparatus of the type having means including image forming optics for projecting and focusing the colors of a two-dimensional color image onto respective color planes, a color image sensor means having a plurality of linear array sensors mounted in a flat plane with each linear array being responsive to a particular color for providing an output indicative of the intensity of the light impinging thereon, means for scanning the projected image at a predetermined line scan rate, and means for continuously displacing the projected image in a direction perpendicular to the line scan to effect an image scan composed of a number of spaced lines, the improvement comprising:

mounting means for mounting said color image sensor at an angle with respect to the projected image such that the focal planes of the projected colors are co-incident with the linear array sensors responsive to said colors; and forming each linear array with a length that is a function of the distortion or the chromatic aberration of said image forming optics.

5. In a color image scanning apparatus of the type having means including image forming optics for projecting and focusing the colors of a two-dimensional color image onto respective color planes, a color image sensor means having a plurality of linear array sensors mounted in a flat plane with each linear array being responsive to a particular color for providing an output indicative of the intensity of the light impinging thereon, means for scanning the projected image at a predetermined line scan rate, and means for continuously displacing the projected image in a direction perpendicular to the line scan to effect an image scan composed of a number of spaced lines, the improvement comprising:

mounting means for mounting said color image sensor at an angle with respect to the projected image such that the focal planes of the projected colors are co-incident with the linear array sensors responsive to said colors and wherein each linear array is formed of a plurality of sensing elements each spaced from the others by a spacing that minimizes the distortion of the lateral chromatic aberration of said image forming optics.

6. In a color image scanning apparatus of the type having means including image forming optics for projecting and focusing the colors of a two-dimensional color image onto respective color planes, a color image sensor means having a plurality of linear array sensors mounted in a flat plane with each linear array being responsive to a particular color for providing an output indicative of the intensity of the light impinging thereon, means for scanning the projected image at a predetermined line scan rate, and means for continuously displacing the projected image in a direction perpendicular to the line scan to effect an image scan composed of a number of spaced lines, the improvement comprising:

forming each linear array with a length that is a function of the distortion or the chromatic aberration of said image forming optics.

7. In a color image scanning apparatus of the type having means including image forming optics for projecting and focusing the colors of a two-dimensional color image onto respective color planes, a color image sensor means having a plurality of linear array sensors mounted in a flat plane with each linear array being responsive to a particular color for providing an output indicative of the intensity of the light impinging thereon, means for scanning the projected image at a predetermined line scan rate, and means for continuously displacing the projected image in a direction perpendicular to the line scan to effect an image scan composed of a number of spaced lines, the improvement comprising:

forming each linear array spaced from the others by a spacing that minimizes the distortion of the lateral chromatic aberration of said image forming optics.

* * * * *